United States Patent
Haag

(10) Patent No.: US 7,963,150 B2
(45) Date of Patent: Jun. 21, 2011

(54) METHOD TO TEST FOR A LEAK IN A FUEL TANK SYSTEM

(75) Inventor: Silke Haag, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 596 days.

(21) Appl. No.: 11/964,940

(22) Filed: Dec. 27, 2007

(65) Prior Publication Data

US 2009/0007641 A1 Jan. 8, 2009

(30) Foreign Application Priority Data

Dec. 27, 2006 (DE) .................. 10 2006 061 556
Apr. 10, 2007 (DE) .................. 10 2007 016 859

(51) Int. Cl.
*G01M 3/04* (2006.01)

(52) U.S. Cl. ....................................... 73/49.2

(58) Field of Classification Search ............ 73/49.3, 73/49.2

See application file for complete search history.

(56) References Cited

U.S. PATENT DOCUMENTS

| | | | | |
|---|---|---|---|---|
| 5,263,462 A * | 11/1993 | Reddy | ............ | 123/520 |
| 6,550,316 B1 * | 4/2003 | Wong et al. | ............ | 73/49.7 |
| 6,820,466 B2 * | 11/2004 | Streib | ............ | 73/49.2 |
| 2004/0030487 A1 * | 2/2004 | Streib | ............ | 701/114 |
| 2008/0098800 A1 * | 5/2008 | Herzog et al. | ............ | 73/49.2 |

FOREIGN PATENT DOCUMENTS

| | | |
|---|---|---|
| DE | 196 36 431 | 3/1998 |
| EP | 0 952 332 | 10/1999 |
| EP | 1 269 005 | 1/2003 |
| WO | WO 01/69073 | 9/2001 |

* cited by examiner

*Primary Examiner* — Hezron Williams
*Assistant Examiner* — Tamiko D Bellamy
(74) *Attorney, Agent, or Firm* — Merchant & Gould P.C.

(57) ABSTRACT

A method to test for a leak in a fuel tank system of a motor vehicle includes a fuel tank is cut off during the overrun by means of at least one cutoff device, and the pressure, which builds up in the fuel tank within a specifiable time interval is acquired; if a specifiable maximum pressure or a specifiable vacuum threshold is not achieved, said cutoff device is opened and closed again after a specifiable time period, and a vacuum is produced and acquired in a subsequent vacuum phase, and a parameter, which characterizes the leak tightness, is determined and evaluated from the vacuum achieved within a specifiable time period and the overpressure, which is achieved, and the test for a leak is concluded; if the specifiable maximum pressure is achieved, a parameter characterizing the leak tightness is determined from the acquired overpressure and the specifiable overpressure threshold and is compared with a specifiable reference value and for the case that the determined parameter is smaller than the reference value, a leak-proof fuel tank system is suggested and the test for a leak is concluded, and if the determined parameter is greater than the specifiable reference value, the cutoff device is opened and a vacuum is produced and acquired in the fuel tank in a subsequent vacuum phase, whereby a leak-proof fuel tank system is then suggested if a specifiable vacuum threshold is achieved, and hence the test for a leak is concluded, and whereby the test for a leak is then concluded if the vacuum threshold is not achieved within a specifiable time period, and hence the parameter characterizing the leak tightness is evaluated.

3 Claims, 2 Drawing Sheets

METHOD TO TEST FOR A LEAK IN A FUEL TANK SYSTEM

TECHNICAL FIELD

The invention concerns a method to test for a leak in a fuel tank system according to the preamble of the independent claim 1.

BACKGROUND

Methods and devices to test for a leak in fuel tank systems have been known for a long time in varying forms of embodiment. In most of them, an overpressure or a vacuum is introduced into the fuel tank system, which is cut off, and on the basis of the pressure gradient, which builds up in the process, a leak-proof or leaky fuel tank system is suggested. Methods of this kind proceed, for example, from the German patent DE 196 36 431 A1.

A method and a device to determine leakages in the fuel supply system of a motor vehicle are known from the European patent EP 0 952 332 B1, wherein the leak diagnosis results from an analysis of a signal of a differential pressure sensor. By means of this analysis, influencing factors, such as the fuel tank fill level and the fuel outgassing, can be taken into consideration.

During the SAE-High Tech Conference in Indianapolis in 1999, a method referred to as the "natural vacuum leakage detection (NVLD)" was introduced, wherein the fuel tank is cut off for a specified period of time by means of a cutoff device. When the tank is leak-proof, a vacuum results thereby. Provision is made in this method for a vacuum switch, which changes its switching status starting at a certain threshold value. This switching status is acquired. If no switching action is acquired within a specific time span, the presence of a leak is suggested. The idea behind this method consists of utilizing the vacuum, which normally occurs when the motor vehicle is turned off and the tank is cut off, to test the leak tightness of the fuel tank system. It is thereby assumed that the vacuum results from a cooling down of the fuel tank.

A method became known from the patent WO 01/69073 A1; wherein during the overrun, i.e. when the vehicle has just been turned off, a check valve is closed, and during the overpressure phase, which initially takes place subsequent to the valve closing, the overpressure is measured. If this overpressure no longer increases, the check valve is again opened and is closed again after a specified time span. A vacuum phase takes place immediately subsequent to this, wherein the vacuum is measured or is ascertained in another way. After completion of both of these phases, the leak tightness of the fuel tank system is suggested from the overpressure and the vacuum. This method is disadvantageous; in that during both of the phases, during the vacuum phase as well as during the overpressure phase, the check valve has to be repeatedly opened and closed; and in the this time period an acquisition of the overpressure and the vacuum also has to take place. That requires that corresponding measuring devices are employed during these phases. In so doing, the battery of the motor vehicle is significantly stressed.

SUMMARY

The method according to the invention with the characteristics of independent claim 1 has in contrast the advantage that the battery is stressed significantly less. In order to protect the battery, the overpressure is initially acquired in the overpressure phase after the motor vehicle has been turned off and the fuel tank system has been cut off by a cutoff device, especially a check valve; and when a maximum pressure or a specified overpressure threshold has been achieved, a normalized parameter characterizing the leak tightness is determined, which is compared with a specifiable, applicable value. If the parameter determined is smaller than the specifiable value, a leak-proof system is suggested and the diagnosis is completed. If the parameter is, however, not smaller than the specifiable value, the check valve is opened and the vacuum phase is subsequently implemented. A vacuum threshold is calculated for the vacuum phase from the overpressure and the specifiable pressure threshold. If this vacuum threshold is not achieved within a specifiable, determined time period, the test for a leak is completed, and the parameter characterizing leak tightness is evaluated.

An advantageous embodiment of the method is the subject matter of the sub-claim referring to claim 1.

Thus, a maximum pressure is then preferably suggested if the acquired pressure is smaller than the specifiable pressure threshold for a specifiable time period.

BRIEF DESCRIPTION OF THE DRAWINGS

Examples of embodiment of the invention are depicted in the diagrams and are described in detail in the following description.

The following are shown in the diagram.

DETAILED DESCRIPTION

Figure 1:
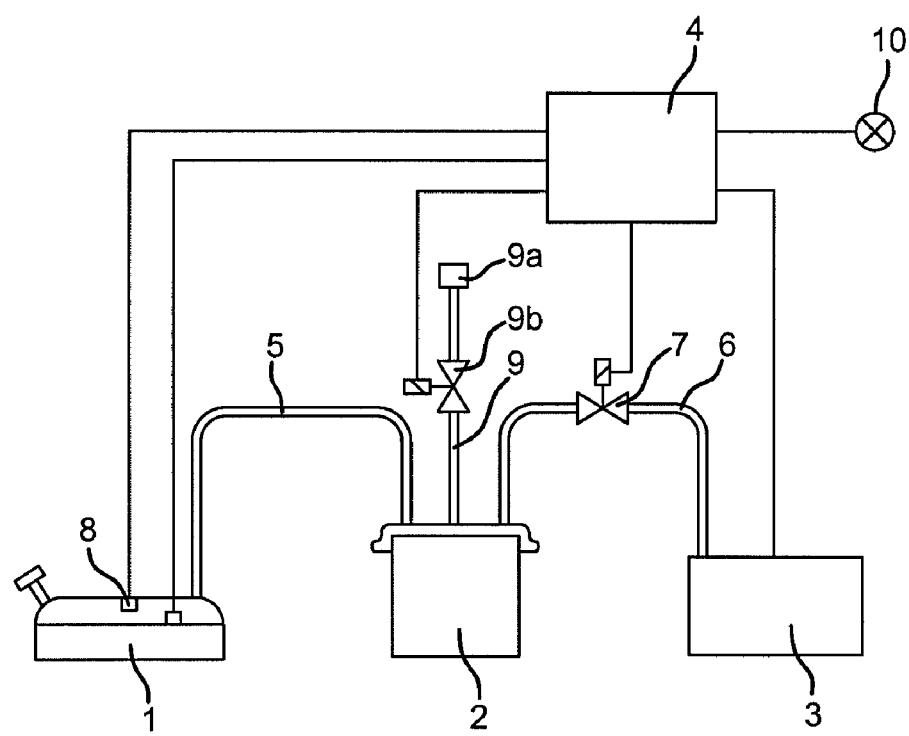
FIG. 1 a fuel tank system of a motor vehicle, wherein the method according to the invention can be employed and FIG. 2 a schematically depicted flow diagram of the method according to the invention.

An example of embodiment of a fuel tank system of a motor vehicle, schematically depicted in FIG. 1, comprises a fuel tank 1 and an adsorption filter 2. The tank 1 is connected to the adsorption filter 2 by way of a fuel tank connecting line 5. The adsorption filter 2 is connected to an internal combustion engine 3 by way of an additional line 6. A cutoff device in the form of a fuel tank ventilation valve 7, which can be actuated by a switching unit 4, is disposed in the line 6. A pressure sensor 8, whose output signals are supplied to the switching unit 4, is additionally disposed in the fuel tank 1. The switching unit 4 sends and receives signals to and from the internal combustion engine in an inherently known manner. An error light 10 serves the purpose of indicating diagnostic results.

Hydrocarbons, which collect in the adsorption filter 2, develop in the fuel tank 1 as a result of vaporization. To regenerate the adsorption filter 2, the fuel tank ventilation valve 7 is opened so that air from the atmosphere is drawn through a line 9, which is connected to the atmosphere, across a filter 9a and through the adsorption filter 2 due to the vacuum prevailing in an intake manifold of the internal combustion engine 3, into which line 6 opens out, whereby the hydrocarbons collected in the adsorption filter 2 travel into the intake manifold and are supplied to the internal combustion engine 3. In this case a valve 9b, which is disposed in the line 9 and is actuated by the switching unit 4, is switched to the opening position.

Figure 2:
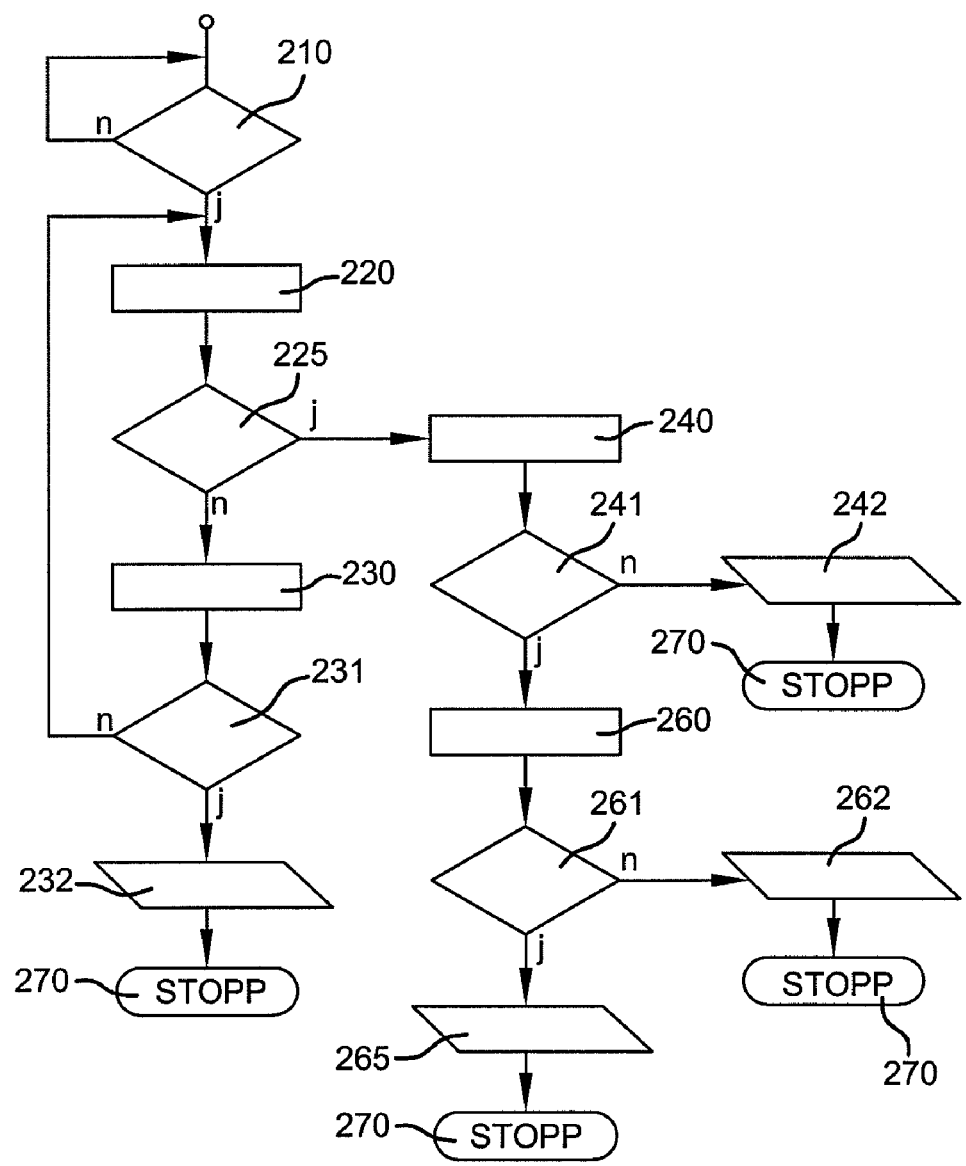

A method to test for leaks in such a fuel tank system is explained below in connection with the flow diagram depicted in FIG. 2.

A test is initially made in step 210 to determine if the motor vehicle is shut down, i.e. the internal combustion engine 3 is turned off and the motor vehicle is at rest. If this does not apply, the test for leaks is not performed, and the process jumps back in front of step 210. If this, however, is the case, the fuel tank ventilation valve 7 is closed in step 220. The fuel tank 2 can be tightly sealed off from the ambience with said valve. It goes without saying that the line 9 is also in this case tightly sealed off by means of the actuation of valve 9b. At the same time the overpressure, which builds up, is measured. A test is made in step 225 to determine whether a maximum pressure is achieved. If this is not the case, the measuring time is acquired in step 230, and this is compared with a specifiable time threshold in step 231.

If the measuring time exceeds the specifiable time threshold, an error message is released in step 232, and the method is concluded in step 270. If the time threshold, however, is not achieved, the process jumps back in front of step 220, and the pressure continues to be acquired and a test continues to be made in step 225 to determine whether a maximum pressure was achieved.

A maximum pressure is then suggested in the process if the pressure within a specifiable period of time is smaller than a specifiable pressure threshold, which is to be determined empirically, by a specifiable amount. If this maximum pressure is achieved, a parameter characterizing the leak tightness is determined in step 240 from the overpressure acquired and the specifiable pressure threshold. This parameter is compared with a specifiable value in step 241. If the parameter determined is not greater than the specifiable value in step 241, a leak-proof fuel tank system is suggested in step 242, and the method immediately concludes with step 270. In the other case, the check valve is open, and the vacuum phase is subsequently implemented in step 260. At the same time, the fuel tank ventilation valve 7 as well as the valve 9b, which can be actuated, is closed; and thus the fuel tank system is tightly sealed off and a vacuum is produced in the fuel tank system. In step 265 the vacuum is compared with a vacuum threshold value, which is determined from the measured overpressure and the specifiable vacuum threshold. If the vacuum threshold value is undershot, a leak-proof fuel tank system is suggested in step 265, and the method concludes with step 270. If the vacuum threshold value is not undershot, after a certain specifiable time period, a parameter, which characterizes the leak tightness, is calculated and evaluated in step 262. The method concludes then in step 270.

The method described above has the great advantage, in that in contrast to the method proceeding, for example, from the European patent EP 1 269 005, an overpressure test and a vacuum test do not have to be performed in each case during the overrun of the motor vehicle, i.e. when the vehicle is turned off. On the contrary, said method is advantageous, in that the overpressure phase is concluded, if an evaluation parameter is not achieved or if the maximum time period is exceeded; and in that additionally in the case of the vacuum phase, a dynamic vacuum threshold is calculated from the measured overpressure and a specifiable overpressure threshold and in as far as the undershooting of a rigid vacuum threshold need not be anticipated.

By means of these measures, a significant reduction in the stress placed on the motor vehicle's battery is made possible.

The invention claimed is:

1. A method of testing for a leak in a fuel tank system of a motor vehicle, comprising:
    cutting off a fuel tank during an overrun by at least one cutoff device and acquiring a pressure that builds up in the fuel tank within a specifiable time interval; and
    when a specifiable maximum pressure or a specifiable vacuum threshold is unrealized,
        opening the at least one cutoff device and closing the at least cutoff device again after a specifiable time period,
        producing and acquiring a vacuum in a subsequent vacuum phase,
        determining and evaluating a first parameter that characterizes leak tightness from the vacuum achieved within a specifiable time period and an achieved overpressure,
    when the specifiable maximum pressure is realized,
        determining a second parameter characterizing leak tightness from the overpressure and a specifiable overpressure threshold and comparing the second parameter with a specifiable reference value,
        upon the second parameter being found less than the reference value, suggesting a leak-proof fuel tank system; and
    when the determined second parameter is greater than the specifiable reference value,
        opening the cutoff device,
        producing and acquiring a vacuum in the fuel tank in a subsequent vacuum phase, wherein a leak-proof fuel tank system is suggested when a specifiable vacuum threshold is achieved and the test for a leak is concluded, and whereby the test for a leak is then concluded if the vacuum threshold is not achieved within a specifiable time period, and thereby a parameter characterizing leak tightness is evaluated.

2. A method according to claim 1 further comprising, suggesting a maximum pressure when the acquired pressure is less than the specifiable overpressure threshold by a specifiable amount for a specifiable length of time.

3. A method according to claim 1 further comprising, dynamically calculating the specifiable vacuum threshold from the specifiable overpressure threshold and the acquired overpressure during the vacuum phase.

* * * * *